US008436091B2

(12) United States Patent
Brandau et al.

(10) Patent No.: US 8,436,091 B2
(45) Date of Patent: May 7, 2013

(54) NITRILE RUBBERS

(75) Inventors: Sven Brandau, Strasbourg (FR); Hans Magg, Kürten (DE); Michael Klimpel, Langenfeld (DE)

(73) Assignee: LANXESS Deutschland GmbH, Leverkusen, DE (US)

( * ) Notice: Subject to any disclaimer, the term of this patent is extended or adjusted under 35 U.S.C. 154(b) by 70 days.

(21) Appl. No.: 12/905,132

(22) Filed: Oct. 15, 2010

(65) Prior Publication Data

US 2011/0190441 A1 Aug. 4, 2011

(30) Foreign Application Priority Data

Nov. 3, 2009 (EP) .................................. 09174921

(51) Int. Cl.
*C08L 9/02* (2006.01)
*C08F 4/06* (2006.01)

(52) U.S. Cl.
USPC .......... 524/565; 524/607; 526/96; 525/329.3; 525/189; 528/360

(58) Field of Classification Search .................. 524/565, 524/607; 526/96; 525/329.3, 189; 528/360
See application file for complete search history.

(56) References Cited

U.S. PATENT DOCUMENTS

| | | | |
|---|---|---|---|
| 2,451,180 A | 10/1948 | Stewart | |
| 2,716,107 A * | 8/1955 | Brown | 526/94 |
| 2,897,167 A * | 7/1959 | Dreisbach et al. | 524/777 |
| 2,968,645 A * | 1/1961 | Sterling | 526/93 |
| 3,322,746 A | 5/1967 | Nudenberg et al. | |
| 3,700,637 A | 10/1972 | Finch, Jr. | |
| 4,464,515 A | 8/1984 | Rempel et al. | |
| 4,503,196 A | 3/1985 | Rempel et al. | |
| 4,581,417 A | 4/1986 | Buding et al. | |
| 4,631,315 A | 12/1986 | Buding et al. | |
| 4,746,707 A | 5/1988 | Fiedler et al. | |
| 4,795,788 A | 1/1989 | Himmler et al. | |
| 4,812,528 A | 3/1989 | Rempel et al. | |
| 4,816,525 A | 3/1989 | Rempel et al. | |
| 4,826,721 A | 5/1989 | Obrecht et al. | |
| 4,978,771 A | 12/1990 | Fiedler et al. | |
| RE34,548 E | 2/1994 | Fiedler et al. | |
| 5,556,919 A | 9/1996 | Oyama et al. | |
| 5,627,250 A | 5/1997 | Tsuji et al. | |
| 5,703,189 A | 12/1997 | Tsuji et al. | |
| 5,807,941 A | 9/1998 | Tsuji et al. | |
| 6,498,223 B2 | 12/2002 | Sakata et al. | |
| 6,673,881 B2 | 1/2004 | Guerin | |
| 6,683,136 B2 | 1/2004 | Guo et al. | |
| 6,780,939 B2 | 8/2004 | Guerin et al. | |
| 7,772,328 B2 | 8/2010 | Guerin et al. | |
| 2004/0236029 A1 | 11/2004 | Guerin et al. | |
| 2008/0293868 A1 | 11/2008 | Obrecht | |
| 2008/0293889 A1 * | 11/2008 | Obrecht | 525/233 |
| 2010/0240838 A1 | 9/2010 | Guerin et al. | |
| 2010/0240848 A1 | 9/2010 | Guerin et al. | |

FOREIGN PATENT DOCUMENTS

| | | |
|---|---|---|
| CA | 2048929 | 2/1992 |
| GB | 1558491 A | 1/1980 |

OTHER PUBLICATIONS

European Search Report from co-pending Application No. 09174921.8 dated Jun. 7, 2010 (4 pages).
Hofmann W.; Rubber Chem. Technol. 36 (1963) 1; "Vulcanizate Structure, Relaxation, and Tensile Strength of Polyisoprenes" pp. 815-834.
Ullmann's Encyclopedia of Industrial Chemistry, vol. A23, VCH Verlagsgesellschaft, Weinheim 1993, pp. 255-261 Rubber, 3. Synthetic.
Ullmann's Encyclopedia of Industrial Chemistry, 6th Ed, vol. 31, pp. 345-355, Year: 2003.
Ullmann's Encyclopedia of Industrial Chemistry, 6th Ed, vol. 13, pp. 75-108, Year: 2003.

* cited by examiner

*Primary Examiner* — Robert D. Harlan
(74) *Attorney, Agent, or Firm* — Nicanor A. Kohncke

(57) ABSTRACT

Through the use of an improved iron-based redox system it is possible to prepare special new, optionally hydrogenated, nitrile rubbers which feature a more uniform monomer distribution and a lower fraction of long-chain branches and hence are distinguished by enhanced flow properties at the same time as very good properties on processing.

10 Claims, No Drawings

NITRILE RUBBERS

FIELD OF THE INVENTION

The invention relates to a process for preparing new, optionally hydrogenated nitrile rubbers, to these optionally hydrogenated nitrile rubbers per se and to vulcanizable mixtures comprising them, and also to a process for preparing vulcanizates from these mixtures, and to the resulting vulcanizates.

BACKGROUND OF THE INVENTION

Nitrile rubbers, also referred to in abbreviated form as "NBRs", are rubbers which are copolymers or terpolymers with at least one α,β-unsaturated nitrile, at least one conjugated diene and optionally one or more other copolymerizable monomers. Hydrogenated nitrile rubber, also referred to in abbreviated form as "HNBR", is produced by hydrogenating nitrile rubber. Correspondingly, in HNBR, the C=C double bonds of the copolymerized diene units are wholly or partly hydrogenated. The degree of hydrogenation of the copolymerized diene units is situated typically in a range from 50% to 100%.

Processes for producing such nitrile rubbers are known— see, for example, Ullmann's Encyclopedia of Industrial Chemistry, VCH Verlagsgesellschaft, Weinheim, 1993, pp. 255-261. The polymerization to the nitrile rubbers is typically carried out as an emulsion polymerization and can be initiated free-radically by azo initiators, persulphates, organic peroxides or redox systems. The literature reference above describes redox systems as the initiator systems used predominantly, in the form, for example, of mixtures of organic peroxides, hydroperoxides or persulphates as oxidizing agents with reducing agents such as sodium dithionite or Rongalit (sodium formaldehyde-sulphoxylate). Metal salts are used in this case optionally as a cocatalyst, preferably with addition of suitable complexing agents such as sodium ethylenediaminetetraacetate, sodium nitrilotriacetate, isophthalic acid, trisodium phosphate or tetrapotassium diphosphate. Whether and, if so, to what extent the initiator system affects the properties of the rubber was not a subject of investigation and is not considered at all.

EP-A-0 692 496, EP-A-0 779 301 and EP-A-0 779 300 of Zeon Corporation each describe nitrile rubbers based on an unsaturated nitrile and a conjugated diene. A feature common to all the nitrile rubbers is that they possess 10-60% by weight of unsaturated nitrile and a Mooney viscosity in the range of 15-150 or, according to EP-A-0 692 496, of 15-65, and all contain at least 0.03 mol of a specific $C_{12}$-$C_{16}$ alkylthio group per 100 mol of monomer units. The nitrile rubbers are each produced in the presence of a correspondingly constructed $C_{12}$-$C_{16}$ alkylthiol as molecular weight modifier, which functions as a chain transfer agent and hence is incorporated as an end group into the polymer chains. In the patent applications described, the polymerization is initiated by unspecified organic peroxides, redox initiators, azo compounds or persulphates. Any influence the initiator system might have on the properties of the rubber is not considered.

In U.S. Pat. No. 2,451,180 of the Goodrich Company the polymerization is described for the purpose of preparing poly-1,3-butadienes and copolymers of 1,3-butadiene with other copolymerizable monomers such as, for example, acrylonitrile, using small amounts of water-soluble metal salts from group VIII of the Mendeleev Periodic Table based on iron, cobalt, nickel, palladium, osmium, platinum, etc. Salts of iron, of cobalt and of nickel are specified as being preferred salts. Typical examples of such salts that are recited are, generally, chlorides, nitrates, iodides, bromides, sulphates, sulphites, nitrites and thiocyanates of iron, cobalt, nickel and other group VIII metals, provided that they are water-soluble. With regard to metals which are able to occur in more than oxidation state it is said, generally, that they might be used both in the oxidized form and in the reduced form, for example, as iron(II) sulphate or iron(III) sulphate. It is said that when these metal salts are used, irrespective of whether other common initiators and accelerants are present or not, there is a considerable increase observed in the polymerization rate for a few hours, and, furthermore, that polymerization can be carried out at a low temperature of 20 to 30° C., leading, it is said, to polymers having improved properties, more particularly an improved elongation at break and tensile strength. In the examples, NBR is polymerized in the presence of iron ammonium sulphate, cobalt chloride or nickel sulphate, and using hydrogen peroxide. However, there are no investigations of the properties of the NBR vulcanizates.

U.S. Pat. No. 2,897,167 of Dow Chemical Company describes the emulsion polymerization of conjugated diolefins with methyl isopropenyl ketone or with a mixture of methyl isopropenyl ketone and another vinylidene monomer (e.g. acrylonitrile) to form rubbers or stable latices. In this context it is emphasized in particular that the use of the methyl isopropenyl ketone monomer is necessary in order to prevent gelling and hence the production of precoagulated polymer in the latex prepared. The polymerization is carried out in the presence of a redox system. Sodium formaldehyde-sulphoxylate is used as reducing agent, diisopropylbenzene hydroperoxide as oxidizing agent. In addition, redox-active iron is added in the form of iron(III) chloride or iron(II) sulphate. Any influence of the iron-based redox initiator system on the properties of the latex or rubber prepared is not expounded.

U.S. Pat. No. 2,968,645 of the Dow Chemical Company describes the emulsion polymerization of rubbers in the presence of α- or β-conidendrol (naphtho(2,3-c)furan-1(3H)-one). The α- or β-conidendrol is added to the polymerization in order first to increase the rate of the polymerization and second to obtain its antioxidant effect after the polymerization. Monomers used are the isomoners of butadiene and/or monoolefinic substances. For the redox system, according to the examples and the description, iron(III) chloride and iron (II) sulphate as metal salts are added to this emulsion polymerization. There is no investigation as to what effect the components of the redox system might have on the properties of the rubber.

U.S. Pat. No. 2,716,107 as well discloses the use of redox systems comprising iron(III) chloride or iron(II) sulphate for the polymerization of 1,3-butadiene and one or more vinylic monomers, such as acrylonitrile, for example.

Both NBR and HNBR have for many years occupied a firm place in the field of speciality elastomers. They possess an excellent profile of properties, in the form of excellent oil resistance, good heat resistance, outstanding resistance towards ozone and chemicals, the latter even more pronounced in the case of HNBR than of NBR. Furthermore, they possess very good mechanical properties and performance properties. For this reason they find broad use in a wide variety of application fields, and are employed, for example, in the production of seals, hoses, belts and damping elements in the automotive sector, and also for stators, borehole seals and valve seals in the oil extraction sector, and also for numerous parts in the electrical industry and in mechanical and marine engineering. A large number of different types are available commercially, and, according to area of application, feature different monomers, molecular weights and polydispersities and also mechanical and physical properties. In addition to the standard grades, speciality grades containing specific tertmonomers or having particular functionalizations are increasingly in demand in particular. There is also a demand for grades which possess good and easy processing properties, in particular a very good fluidity, and whose vulcanizates display a good profile of mechanical properties. Grades having improved fluidity have to date been producible, for example, by employing an additional metathesis process step, which allows the nitrile rubbers to be given a significantly lower Mooney viscosity and hence a lower average molecular weight. Since this is an additional process step, it is not seen as being unrestrictedly positive from an economic viewpoint, and, in terms of their profile of properties, the nitrile rubber grades obtained do not meet all of the requirements.

It was the object of the present invention, therefore, to provide a process which allows the synthesis of nitrile rubbers which possess good and easy processing properties, in particular fluidity, and whose vulcanizates exhibit a very good profile of mechanical properties.

This object is achieved by a new process for producing nitrile rubbers which uses a special redox system as initiator for the emulsion polymerization.

SUMMARY OF THE INVENTION

The invention provides, therefore, a process for preparing nitrile rubbers by emulsion polymerization of at least one α,β-unsaturated nitrile, at least one conjugated diene and optionally one or more other copolymerizable monomers, characterized in that the emulsion polymerization is carried out using a redox system which comprises
  (i) as oxidizing agent at least one peroxo compound,
  (ii) at least one reducing agent and
  (iii) Fe(II) chloride.

DETAILED DESCRIPTION OF THE INVENTION

The process of the invention can also be utilized for producing hydrogenated nitrile rubbers, by subsequently performing a hydrogenation reaction. This hydrogenation reaction may also be preceded by a metathesis reaction for molecular weight reduction.

The invention provides, in addition, optionally hydrogenated nitrile rubbers having repeating units derived from at least one α,β-unsaturated nitrile, at least one conjugated diene and optionally one or more other copolymerizable monomers, obtainable by emulsion polymerization of at least one unsaturated nitrile, at least one conjugated diene and optionally one or more other copolymerizable monomers using a redox system comprising
  (i) as oxidizing agent at least one peroxo compound,
  (ii) at least one reducing agent and
  (iii) Fe(II) chloride
and a hydrogenation subsequently in the case of the hydrogenated nitrile rubbers.

Surprisingly it is possible through the process of the invention to provide, by a simple process route, the special new nitrile rubbers and wholly or partly hydrogenated new nitrile rubbers. These new rubbers are unexpectedly notable over their known counterparts for a very low level of long-chain branching and a very low gel content. Accordingly they possess a high fluidity and, consequently, can be processed very easily. Furthermore, in relation to nitrile rubbers obtained using other redox systems, the optionally hydrogenated nitrile rubbers have a significantly more uniform distribution of the various monomers along the polymer chains. This unexpected effect can be determined, as outlined below, via the breadth of the glass temperature transition (derived by way of the Gordon Taylor relationship). In this way there has been a solution for the first time to the fundamental problem that the conjugated dienes, especially 1,3-butadiene, and α,β-unsaturated nitriles, especially acrylonitrile, used in producing nitrile rubbers possess very different reactivities and it has to date been possible only by means of a corresponding metering regime in the course of the polymerization to ensure that the quantity of product produced comprises polymer molecules having a sufficient chemical uniformity, which is to say a uniform distribution of the various monomers along the polymer chains.

Over and above this, vulcanizates produced from the optionally hydrogenated nitrile rubbers possess a consistently very good profile of properties.

In the aforementioned publications of the prior art there is no disclosure or information as to whether and, if so, in what form it is possible to influence the properties of the nitrile rubbers in the case of a free-radical emulsion polymerization through the choice or composition of specific redox initiator systems. The influence of the chloride as against the sulphate as anion, in particular, was completely surprising, since in the literature, in the experimental examples, exclusively iron(II) sulphates were continually used (see U.S. Pat. No. 2,897,167 and U.S. Pat. No. 2,716,107).

Nitrile Rubber:

The nitrile rubbers of the invention have repeating units of at least one α,β-unsaturated nitrile, at least one conjugated diene and optionally one or more other copolymerizable monomers.

The conjugated diene may be of any kind. It is preferred to use $(C_4-C_6)$-conjugated dienes. Particular preference is given to 1,3-butadiene, isoprene, 2,3-dimethylbutadiene, 1,2-butadiene, piperylene, 1,3-pentadiene or mixtures thereof. Particularly preferred are 1,3-butadiene and isoprene or mixtures thereof. 1,3-Butadiene is especially preferred.

As α,β-unsaturated nitrile it is possible to use any known α,β-unsaturated nitrile, preference being given to $(C_3-C_5)$-α,β-unsaturated nitriles such as acrylonitrile, methacrylonitrile, 1-chloroacrylonitrile, ethacrylonitrile, 2-cyanoacrylates or mixtures thereof. Acrylonitrile is particularly preferred.

One particularly preferred nitrile rubber is a copolymer of acrylonitrile and 1,3-butadiene.

In addition to the repeating units derived from at least one conjugated diene and from at least one α,β-unsaturated nitrile, the optionally hydrogenated nitrile rubber of the invention may also comprise, as well, repeating units which derive from one or more other copolymerizable monomers.

Examples of monomers suitable for this purpose include carboxyl-containing, copolymerizable termonomers, preferably α,β-unsaturated monocarboxylic acids, their esters or amides, α,β-unsaturated dicarboxylic acids, their monoesters or diesters, and also the corresponding anhydrides or amides.

As α,β-unsaturated monocarboxylic acids it is possible with preference to use acrylic acid and methacrylic acid.

It is also possible to employ esters of the α,β-unsaturated monocarboxylic acids, preferably their alkyl esters and alkoxyalkyl esters. Preference is given to the alkyl esters, especially $C_1-C_{18}$ alkyl esters, of the α,β-unsaturated monocarboxylic acids. Particular preference is given to alkyl esters, especially $C_1-C_{18}$ alkyl esters, of acrylic acid and of methacrylic acid, more particularly methyl(meth)acrylate, ethyl(meth)acrylate, propyl(meth)acryl ate, n-butyl(meth)acrylate, t-butyl(meth)acrylate, hexyl(meth)acrylate, 2-ethylhexyl(meth)acrylate, octyl(meth)acrylate, n-dodecyl (meth)acrylate and lauryl(meth)acrylate. n-Butyl acrylate is used in particular. Preference is also given to alkoxyalkyl esters of the α,β-unsaturated monocarboxylic acids, more preferably alkoxyalkyl esters of acrylic acid or of methacrylic acid, especially $C_2$-$C_{12}$ alkoxyalkyl esters of acrylic acid or of methacrylic acid, very preferably methoxymethyl(meth) acrylate, ethoxyethyl(meth)acrylate and methoxyethyl (meth)acrylate. Methoxyethyl acrylate is used in particular. It is also possible to employ mixtures of alkyl esters, such as those mentioned above, for example, with alkoxyalkyl esters, in the form of those mentioned above, for example. Also employable are cyanoalkyl acrylates and cyanoalkyl methacrylates in which the C atom number of the cyanoalkyl group is 2-12, preferably α-cyanoethyl acrylate, β-cyanoethyl acrylate and cyanobutyl methacrylate. Use may also be made of hydroxyalkyl acrylates and hydroxyalkyl methacrylate in which the C atom number of the hydroxyalkyl groups is 1-12, preferably hydroxyethyl(meth)acrylate, hydroxypropyl (meth)acrylate and hydroxybutyl(meth)acrylate. It is also possible to employ fluorine-substituted benzyl group-containing acrylates or methacrylates, preferably fluorobenzyl (meth)acrylate. Use may also be made of (meth)acrylates containing fluoroalkyl groups, preferably trifluoroethyl acrylate and tetrafluoropropyl methacrylate. Possible for use as well are amino-containing, α,β-unsaturated carboxylic esters such as dimethylaminomethyl acrylate and diethylaminoethyl acrylate.

Other esters of α,β-unsaturated monocarboxylic acids used are, furthermore, for example, polyethylene glycol (meth)acrylate, polypropylene glycol(meth)acrylate, glycidyl(meth)acrylate, epoxy(meth)acrylate, N-(2-hydroxyethyl)acrylamides, N-(2-hydroxymethyl)acrylamides and urethane(meth)acrylate.

As other copolymerizable monomers it is possible, furthermore, to use α,β-unsaturated dicarboxylic acids, preferably maleic acid, fumaric acid, crotonic acid, itaconic acid, citraconic acid and mesaconic acid.

Use may be made, furthermore, of α,β-unsaturated dicarboxylic anhydrides, preferably maleic anhydride, itaconic anhydride, citraconic anhydride and mesaconic anhydride.

Use may be made, furthermore, of monoesters or diesters of α,β-unsaturated dicarboxylic acids. These are, for example, alkyl, preferably $C_1$-$C_{10}$ alkyl, more particularly ethyl, n-propyl, isopropyl, n-butyl, tert-butyl, n-pentyl or n-hexyl, alkoxyalkyl, preferably $C_2$-$C_{12}$ alkoxyalkyl, more preferably $C_3$-$C_8$ alkoxyalkyl, hydroxyalkyl, preferably $C_1$-$C_{12}$ hydroxyalkyl, more preferably $C_2$-$C_8$ hydroxyalkyl, cycloalkyl, preferably $C_5$-$C_{12}$ cycloalkyl, more preferably $C_6$-$C_{12}$ cycloalkyl, alkylcycloalkyl, preferably $C_6$-$C_{12}$ alkylcycloalkyl, more preferably $C_7$-$C_{10}$ alkylcycloalkyl, aryl, preferably $C_6$-$C_{14}$ aryl, monoesters or diesters, and in the case of the diesters may in each case also be mixed esters.

Examples of α,β-unsaturated dicarboxylic monoesters encompass maleic acid monoalkyl esters, preferably monomethyl maleate, monoethyl maleate, monopropyl maleate and mono-n-butyl maleate;
maleic acid monocycloalkyl esters, preferably monocyclopentyl maleate, monocyclohexyl maleate and monocycloheptyl maleate;
maleic acid monoalkyl cycloalkyl esters, preferably monomethyl cyclopentyl maleate and monoethyl cyclohexyl maleate;
maleic acid monoaryl esters, preferably monophenyl maleate;
maleic acid monobenzyl esters, preferably monobenzyl maleate;
fumaric acid monoalkyl esters, preferably monomethyl fumarate, monoethyl fumarate, monopropyl fumarate and mono-n-butyl fumarate;
fumaric acid monocycloalkyl esters, preferably monocyclopentyl fumarate, monocyclohexyl fumarate and monocycloheptyl fumarate;
fumaric acid monoalkyl cycloalkyl esters, preferably monomethyl cyclopentyl fumarate and monoethyl cyclohexyl fumarate;
fumaric acid monoaryl esters, preferably monophenyl fumarate;
fumaric acid monobenzyl esters, preferably monobenzyl fumarate;
citraconic acid monoalkyl esters, preferably monomethyl citraconate, monoethyl citraconate, monopropyl citraconate and mono-n-butyl citraconate;
citraconic acid monocycloalkyl esters, preferably monocyclopentyl citraconate, monocyclohexyl citraconate and monocycloheptyl citraconate;
citraconic acid monoalkyl cycloalkyl esters, preferably monomethyl cyclopentyl citraconate and monoethyl cyclohexyl citraconate;
citraconic acid monoaryl esters, preferably monophenyl citraconate;
citraconic acid monobenzyl esters, preferably monobenzyl citraconate;
itaconic acid monoalkyl esters, preferably monomethyl itaconate, monoethyl itaconate, monopropyl itaconate and mono-n-butyl itaconate;
itaconic acid monocycloalkyl esters, preferably monocyclopentyl itaconate, monocyclohexyl itaconate and monocycloheptyl itaconate;
itaconic acid monoalkyl cycloalkyl esters, preferably monomethyl cyclopentyl itaconate and monoethyl cyclohexyl itaconate;
itaconic acid monoaryl esters, preferably monophenyl itaconate;
itaconic acid monobenzyl esters, preferably monobenzyl itaconate.
Mesaconic acid monoalkyl esters, preferably mesaconic acid monoethyl esters;

As α,β-unsaturated dicarboxylic diesters it is possible to use the analogous diesters based on the abovementioned monoester groups, and the ester groups may also be chemically different groups.

Other possible monomers are vinylaromatics such as styrene, α-methylstyrene and vinylpyridine, and also non-conjugated dienes, such as 4-cyanocyclohexene (4-CCN) and 4-vinylcyclohexene (VCH), and alkynes, especially 1- or 2-butyne.

It is additionally possible, as further copolymerizable monomers, to use free-radically polymerizable compounds which contain two or more olefinic double bonds per molecule. Examples of compounds of this kind which are unsaturated two or more times are diunsaturated or polyunsaturated acrylates, methacrylates or itaconates of polyols, such as 1,6-hexanediol diacrylate, 1,6-hexanediol dimethacrylate, ethylene glycol diacrylate, ethylene glycol dimethacrylate (EGDMA), diethylene glycol dimethacrylate, triethylene glycol diacrylate, butane-1,4-diol diacrylate, propane-1,2-diol diacrylate, butane-1,3-diol dimethacrylate, neopentylglycol diacrylate, trimethylolpropane diacrylate, trimethylolpropane dimethacrylate, trimethylolethane diacrylate, trimethylolethane dimethacrylate, trimethylolpropane triacrylate, trimethylolpropane trimethacrylate (TMPTMA), glyceryl di- and tri-acrylate, pentaerythrityl di-, tri- and tetraacrylate or -methacrylate, dipentaerythrityl tetra-, penta- and hexa-acrylate or -methacrylate or -itaconate, sorbitol tetraacrylate, sorbitol hexamethacrylate, diacrylates or dimethacrylates of 1,4-cyclohexanediol, 1,4-dimethylolcyclohexane, 2,2-bis(4-hydroxyphenyl)propane, of polyethylene glycols or of oligoesters or oligourethanes having terminal hydroxyl groups. Other polyunsaturated monomers which can be used include acrylamides, such as methylenebisacrylamide, hexamethylene-1,6-bisacrylamide, diethylenetriaminetrismethacrylamide, bis(methacrylamidopropoxy)ethane or 2-acrylamidoethyl acrylate. Examples of polyunsaturated vinyl and allyl compounds are divinylbenzene, ethylene glycol divinyl ether, diallyl phthalate, allyl methacrylate, diallyl maleate, triallyl isocyanurate or triallyl phosphate.

The proportions of conjugated diene and α,β-unsaturated nitrile in the optionally hydrogenated nitrile rubbers of the invention may vary within wide ranges. The proportion of or the sum of the conjugated dienes is typically in the range from 20% to 95%, preferably in the range from 40% to 90%, more preferably in the range from 50% to 85%, by weight, based on the overall polymer. The proportion of or the sum of the α,β-unsaturated nitriles is typically 5% to 80%, preferably 10% to 60%, more preferably 15% to 50%, by weight, based on the overall polymer. The proportions of the monomers add up in each case to 100% by weight.

The additional monomers may be present in amounts of 0% to 40%, preferably 0.1% to 40%, more preferably 1% to 30%, by weight, based on the overall polymer. In this case, corresponding proportions of the conjugated diene or dienes and of the α,β-unsaturated nitrile or nitriles are replaced by the proportions of these additional monomers, with the proportions of all of the monomers continuing to add up in each case to 100% by weight. In the presence of one or more termonomers it has proved to be appropriate for the proportion of or the sum of the conjugated dienes to be in the range from 40% to 90%, preferably in the range from 50% to 85%, by weight, based on the overall polymer, for the proportion of or the sum of the α,β-unsaturated nitriles to be 9.9% to 59.9%, preferably 14% to 50%, by weight, based on the overall polymer, and for the proportion of or the sum of the termonomers to be in the range from 0.1% to 30%, preferably 1% to 20%, by weight, based on the overall polymer, with the necessary condition that the proportions of all of the monomers must add up in each case to 100% by weight.

Where esters of (meth)acrylic acid are used as additional termonomers, they are used usually in amounts of 1% to 25% by weight, based on the overall polymer.

Where esters of α,β-unsaturated monocarboxylic or dicarboxylic acids are used as additional termonomers, they are used usually in amounts of less than 10% by weight, based on the overall polymer.

The nitrogen content for the determination of the acrylonitrile content is determined in the nitrile rubbers of the invention by the Kjeldahl method in accordance with DIN 53 625. By virtue of the presence of polar comonomers, the nitrile rubbers are usually soluble at ≧85% by weight in methyl ethyl ketone at 20° C.

Preference is given to nitrile rubbers of the invention which have repeating units of acrylonitrile, 1,3-butadiene and optionally one or more other copolymerizable monomers. Also preferred are nitrile rubbers which have repeating units of acrylonitrile, 1,3-butadiene and one or more α,β-unsaturated monocarboxylic or dicarboxylic acids, their esters or amides, more particularly repeating units of an alkyl ester of an α,β-unsaturated carboxylic acid, and very preferably of methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate or lauryl(meth)acrylate.

The nitrile rubbers of the invention, which may also be wholly or partly hydrogenated, have Mooney viscosities (ML (1+4 @ 100° C.)) of 10 to 160, preferably of 15 to 150 Mooney units, more preferably of 20 to 150 Mooney units, and in particular 25 to 145 Mooney units. The determination of the values for the Mooney viscosity (ML 1+4 at 100° C.) is made in each case by means of a shearing disc viscometer in accordance with DIN 53523/3 or ASTM D 1646 at 100° C.

The nitrile rubbers used further possess a polydispersity $PDI=M_w/M_n$, where $M_w$ is the weight average and $M_n$ the number average of the molecular weight, in the range of 2.0-6.0 and preferably in the range of 2.0-5.0.

The glass transition temperatures of the nitrile rubbers of the invention, which may also be wholly or partly hydrogenated, are in the range from −70° C. to +10° C., preferably in the range from −60° C. to 0°. The determination of the glass transition temperature, and also of its onset and offset points, as they are called, is made by means of Differential Scanning calorimetry (DSC) in accordance with ASTM E 1356-03 or in accordance with DIN 11357-2.

On the basis of the measured onset and offset points it is possible using the Gordon-Taylor relationship $$T_g=1.4564*[ACN]-77.147$$

to calculate an ACN content ([ACN]) for the onset point and for the offset point, and from these values to form a differential (ΔACN) for the ACN distribution:

$$\Delta ACN=ACN(\text{offset})-ACN(\text{onset})$$

This differential ΔACN represents a measure of the uniformity.

The vulcanization profile on the MDR and its associated analytical data are measured on a Monsanto MDR 2000 rheometer in accordance with ASTM D5289-95.

The MSR (Mooney Stress Relaxation) is determined in each case by means of a shearing disc viscometer in accordance with ISO 289-4:2003(E) at 100° C.

Production of the nitrile rubbers of the invention:

The nitrile rubbers are produced by emulsion polymerization. Of essential importance is the redox system used. This system, in order to initiate the emulsion polymerization, comprises an oxidizing agent (i) which breaks down into free radicals.

Oxidizing agents (i) used are peroxo compounds, in other words compounds which have an —O—O unit. The peroxo compounds include hydrogen peroxide, peroxodisulphates, peroxodiphosphates, hydroperoxides, peracids, peracid esters, peracid anhydrides and peroxides having two organic radicals. As salts of peroxodisulphuric acid and of peroxodiphosphoric acid it is possible to use sodium, potassium and ammonium salts. Suitable hydroperoxides are, for example, t-butyl hydroperoxide, cumene hydroperoxide and p-menthane hydroperoxide. Suitable peroxides having two organic radicals are dibenzoyl peroxide, 2,4,-dichlorobenzoyl peroxide, di-t-butyl peroxide, dicumyl peroxide, t-butyl perbenzoate and t-butyl peracetate.

Preference is given to using p-menthane hydroperoxide or pinane hydroperoxide.

Reducing agents (ii) which can be used include, for example, sodium formaldehyde sulphoxylate, sodium benzaldehyde sulphoxylate, reducing sugars, ascorbic acid, sulphenates, sulphinates, sulphoxylates, dithionite, sulphite, metabisulphite, disulphite, sugars, urea, thiourea, xanthogenates, thioxanthogenates, hydrazinium salts, amines and amine derivates such as aniline, dimethylaniline, monoethanolamine, diethanolamine or triethanolamine, preference being given to sodium formaldehyde-sulphoxylate.

The amount of oxidizing agent (1) is typically 0.001 to 1 part by weight per 100 parts by weight of monomers. The molar amount of reducing agent (ii) is in the range from 1 to 1000 mol %, based on the molar amount of the oxidizing agent (i) used. The molar amount of reducing agent (ii) is preferably in the range from 2% to 100%, based on the molar amount of the oxidizing agent (i) used.

The iron(II) chloride used is preferably $FeCl_2 \cdot 4H_2O$.

Further possible additives which may be added in the process of the invention are complexing agents and salts, such as trisodium phosphate, for example. Examples of complexing agents contemplated include sodium ethylenediaminetetraacetate (EDTA), sodium silicate, sodium pyrophosphate or sodium polyphosphate, of which EDTA is preferred. The molar amount of complexing agent in this case is based on the amount of iron(II) chloride used, and is usually selected so as to be at least equimolar thereto.

In one preferred embodiment the process of the invention is carried out using a redox system comprising p-menthane hydroperoxide or pinane hydroperoxide as peroxide, sodium formaldehyde-sulphoxylate as reducing agent, and Fe(II) chloride ($FeCl_2 \cdot 4H_2O$). In one particularly preferred embodiment the process of the invention is carried out using this specific redox system, and in the additional presence of sodium ethylenediaminetetraacetate.

In order to carry out the polymerization, individual, two or more, or all of the components of the redox system are metered in at the beginning of the polymerization or during the polymerization. Where the metered addition takes place at the beginning of the polymerization, the components of the redox system are metered either together or individually into the initial-charge reaction mixture comprising water, the monomers and the emulsifier. It has proved to be appropriate to add the reducing agent and the Fe(II) chloride in the form of a premix solution, whereas the oxidizing agent is added separately.

As emulsifiers it is possible to use water-soluble salts of anionic emulsifiers or else neutral emulsifiers. Preference is given to using anionic emulsifiers.

As anionic emulsifiers it is possible to use modified resin acids which are obtained by dimerisation, disproportionation, hydration and modification of resin acid mixtures comprising abietic acid, neoabietic acid, palustric acid, lavopimaric acid. One particularly preferred modified resin acid is disproportionated resin acid (Ullmann's Encyclopedia of Industrial Chemistry, 6th Edition, Volume 31, pp. 345-355).

As anionic emulsifiers it is also possible to use fatty acids. These contain 6 to 22 C atoms per molecule. They may be fully saturated or else may have one or more double bonds in the molecule. Examples of fatty acids are caproic acid, lauric acid, myristic acid, palmitic acid, stearic acid, oleic acid, linoleic acid and linolenic acid. The carboxylic acids are based typically on origin-specific oils or fats such as, for example, castor oil, cottonseed, groundnut oil, linseed oil, coconut oil, palm kernel oil, olive oil, rapeseed oil, soybean oil, fish oil and bovine tallow, etc. (Ullmann's Encyclopedia of Industrial Chemistry, 6th Edition, Volume 13, pp. 75-108). Preferred carboxylic acids are derived from coconut fatty acid and from beef tallow and are partly or fully hydrogenated.

Carboxylic acids of this kind based on modified resin acids or fatty acids are used in the form of water-soluble lithium, sodium, potassium and ammonium salts. Na salts and K salts are preferred.

Anionic emulsifiers are, furthermore, sulphonates, sulphates and phosphates which are attached to an organic radical. Suitable organic radicals include aliphatic radicals, aromatic radicals, alkylated aromatics, fused aromatics, and methylene-bridged aromatics, it being possible for the methylene-bridged and fused aromatics to be additionally alkylated. The length of the alkyl chains is 6 to 25 C atoms. The length of the alkyl chains attached to the aromatics is between 3 and 12 C atoms.

The sulphates, sulphonates and phosphates as well are used in the form of lithium, sodium, potassium or ammonium salts. The sodium, potassium and ammonium salts are preferred.

Examples of such sulphonates, sulphates and phosphates are Na lauryl sulphate, Na alkylsulphonate, Na alkylarylsulphonate, Na salts of methylene-bridged arylsulphonates, Na salts of alkylated naphthalenesulphonates, and also the Na salts of methylene-bridged naphthalenesulphonates which can also be oligomerized, the degree of oligomerization being between 2 to 10. Typically the alkylated naphthalenesulphonic acids and the methylene-bridged (and optionally alkylated) naphthalenesulphonic acids are present in the form of isomer mixtures, which may also contain more than 1 sulphonic acid group (2 to 3 sulphonic acid groups) in the molecule. Particular preference is given to Na lauryl sulphate, Na alkylsulphonate mixtures with 12 to 18 C atoms, Na alkylarylsulphonates, Na diisobutylenenaphthalenesulphonate, methylene-bridged polynaphthalenesulphonate mixtures, and methylene-bridged arylsulphonate mixtures.

Neutral emulsifiers derive from addition products of ethylene oxide and of propylene oxide with compounds having sufficiently acidic hydrogen. These include, for example, phenol, alkylated phenol and alkylated amines. The average degrees of polymerization of the epoxides are between 2 to 20. Examples of neutral emulsifiers are ethoxylated nonylphenols having 8, 10 and 12 ethylene oxide units. The neutral emulsifiers are usually used not alone but instead in combination with anionic emulsifiers.

Preference is given to the Na and K salts of disproportionated abietic acid and of partially hydrogenated tallow fatty acid, and also mixtures thereof, sodium lauryl sulphate, Na alkylsulphonates, sodium alkylbenzenesulphonate, and also alkylated and methylene-bridged naphthalenesulphonic acids.

The emulsifiers are used in an amount of 0.2 to 15 parts by weight, preferably 0.5 to 12.5 parts by weight, more preferably 1.0 to 10 parts by weight, based on 100 parts by weight of the monomer mixture.

Where the products at the end of the polymerization are latices, which on account of a certain instability have a tendency towards premature self-coagulation, the stated emulsifiers may also be used for post-stabilization of the latices. This may be sensible in particular prior to the removal of unreacted monomers by treatment with steam, and also prior to latex storage.

The emulsion polymerization may be carried out in the presence of molecular weight modifiers. For this purpose, for example, $C_{12}$ mercaptans (e.g. in the form of tertiary dodecyl mercaptans, also referred to in the literature as "TDDM") find application, either individually or as a mixture, or $C_{16}$ mercaptans, either individually or as a mixture. Molecular weight modifiers of this kind are available commercially, for example, from Phillips. The use of a mixture of $C_{12}$ mercaptans comprising 2,2,4,6,6-pentamethylheptane-4-thiol, 2,4,4,6,6-pentamethylheptane-2-thiol, 2,3,4,6,6-pentamethylheptane-2-thiol and 2,3,4,6,6-pentamethylheptane-3-thiol has been found to be appropriate. It can be used in amounts of 0.05 to 3 parts by weight, preferably of 0.1 to 1.5 parts by weight, per 100 parts by weight of the monomer mixture. The metering of such mercaptan compounds or mercaptan mixtures takes place either at the beginning of the polymerization or in portions during the polymerization, with preference being given to the portionwise addition of all components and also individual components of the modifier mixture during the polymerization. Where the specific mixture referred to above is used, the nitrile rubber contains 2,2,4,6,6-pentamethylheptane-4-thio, 2,4,4,6,6-pentamethylheptane-2-thio, 2,3,4,6,6-pentamethylheptane-2-thio and/or 2,3,4,6,6-pentamethylheptane-3-thio end groups.

The polymerization time is in the range from 4 h to 15 h and depends essentially on the acrylonitrile content of the monomer mixture and on the polymerization temperature. The polymerization temperature is in the range from 0 to 30° C., preferably in the range from 5 to 25° C. When conversions in the range from 50% to 95%, preferably in the range from 70% to 90%, are reached, the polymerization is typically stopped. For this purpose a stopper is added to the reaction mixture. Suitability is possessed for example by dimethyl dithiocarbamate, Na nitrite, mixtures of dimethyl dithiocarbamate and Na nitrite, hydrazine and hydroxylamine, and also salts derived therefrom, such as hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylpyrocatechol, or phenothiazine.

The amount of water used in the emulsion polymerization is in the range from 100 to 900 parts by weight, preferably in the range from 120 to 500 parts by weight, with particular preference in the range from 150 to 400 parts by weight of water per 100 parts by weight of the monomer mixture.

In the emulsion polymerization it is also possible to add acids or bases to the aqueous phase for the purpose of pH adjustment and also for the purpose of pH buffering, and in order to reduce the viscosity during the polymerization. For this purpose it is common to use salts of monovalent metals in the form of KOH, NaOH, sodium sulphate, sodium carbonate, sodium hydrogencarbonate, LiCl, NaCl and KCl. Preference is given to sodium and potassium hydroxide, sodium hydrogencarbonate, and lithium, sodium and potassium chloride. The amounts of these electrolytes are in the range of 0 to 1 part by weight, preferably 0 to 0.5 part by weight, per 100 parts by weight of the monomer mixture.

The polymerization can be carried out either batchwise or else continuously in a stirred tank cascade.

If the intention is to produce chemically especially uniform products, then further acrylonitrile and/or butadiene are metered in if the composition is outside the azoetropic butadiene/acrylonitrile ratio. Preference is given to such further addition in the case of NBR grades having acrylonitrile contents of 10% to 34%, and also in the case of the grades having 40% to 50%, by weight of acrylonitrile (W. Hofmann, Rubber Chem. Technol. 36 (1963) 1). The further addition takes place—as specified in DD 154 702, for example—preferably under computer control on the basis of a computer program. This further addition, however, is not necessary, since, as already described, the advantage of the process of the invention is that the specific redox system can already deliver polymers having a high degree of chemical uniformity.

In order to remove unreacted monomers and also volatile constituents, the stopped latex is subjected to a steam distillation. Here, temperatures in the range from 70° C. to 150° C. are employed, with the pressure being reduced in the case of temperatures <100° C. Prior to the removal of the volatile constituents, the latex can be post-stabilized with emulsifier. For this purpose it is advantageous to use the aforementioned emulsifiers in amounts of 0.1 to 2.5%, preferably 0.5% to 2.0%, by weight, based on 100 parts by weight of nitrile rubber.

Before or during coagulation of the latex, one or more antioxidants may be added to the latex. Phenolic, aminic and other antioxidants too are suitable for this purpose.

Suitable phenolic antioxidants are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, ester-group-containing sterically hindered phenols, thioether-containing sterically hindered phenols, 2,2'-methylenebis-(4-methyl-6-tert-butylphenol) (BPH) and also sterically hindered thiobisphenols.

If discoloration of the rubber is of no importance, aminic antioxidants as well are used, examples being mixtures of diaryl-p-phenylenediamines (DTPD), octylated diphenylamine (ODPA), phenyl-a-naphthylamine (PAN), phenyl-β-naphthylamine (PBN), preferably those based on phenylenediamine. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylendiamine (7PPD), N,N'-bis-1,4-(1,4-dimethylpentyl)-p-phenylenediamine (77PD), etc.

The other antioxidants include phosphates such as tris (nonylphenyl)phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are used in general in combination with phenolic antioxidants. TMQ, MBI and MMBI are used in particular for NBR grades which are vulcanized peroxidically.

For the coagulation the latex is adjusted to a pH which is known to the skilled person, by addition of a base, preferably ammonia or sodium hydroxide or potassium hydroxide, or an acid, preferably sulphuric acid or acetic acid.

In one embodiment of the process the coagulation is carried out using at least one salt selected from the group consisting of aluminium, calcium, magnesium, sodium, potassium and lithium salts. Anions of these salts that are used are usually monovalent or divalent anions. Preference is given to halides, more preferably chloride, nitrate, sulphate, hydrogencarbonate, carbonate, formate and acetate.

Suitable examples include sodium chloride, potassium chloride, calcium chloride, magnesium chloride, sodium nitrate, potassium nitrate, sodium sulphate, potassium sulphate, sodium hydrogencarbonate, potassium hydrogencarbonate, sodium carbonate, potassium carbonate, aluminium sulphate, potassium aluminium sulphate (potassium alaum), sodium aluminium sulphate (sodium alaum), sodium acetate, calcium acetate and calcium formate.

Where a water-soluble calcium salt is used for the coagulation of the latex, preference is given to calcium chloride.

The concentration of the solution of one or more salts selected from the group consisting of aluminium, calcium, magnesium, sodium, potassium and lithium salts is 3% to 30% by weight. For preparing the salt solution it is preferred to use water which contains Ca ions.

The total amount needed for latex coagulation of salts selected from the group consisting of aluminium, calcium, magnesium, sodium, potassium and lithium salts is 0.5%-200%, preferably 0.8%-80%, more preferably 1%-50%, by weight of salt, based on 100 parts by weight of nitrile rubber.

In the coagulation it is possible, as well as at least one salt selected from the group defined above, to use precipitation aids. Examples of suitable precipitation aids include water-soluble polymers. These are non-ionic, anionic or cationic.

Examples of non-ionic polymeric precipitation aids are modified cellulose such as hydroxyalkylcellulose or methylcellulose and also adducts of ethylene oxide and propylene oxide with compounds containing acidic hydrogen. Examples of compounds containing acidic hydrogen are as follows: fatty acid, sugars such as sorbitol, mono- and di-fatty acid glycerides, phenol, alkylated phenols, (alkyl)phenol/formaldehyde condensates, etc. The addition products of ethylene oxide and propylene oxide with these compounds may have a random and blockwise construction. Of these products, preference is given to those in which the solubility decreases as the temperature goes up. Characteristic hazing temperatures are in the 0 to 100° C. range, more particularly in the range from 20 to 70° C.

Examples of anionic polymeric precipitation aids are the homopolymers and copolymers of (meth)acrylic acid, maleic acid, maleic anhydride, etc. The Na salt of polyacrylic acid is preferred.

Cationic polymeric precipitation aids are based typically on polyamines and also on homopolymers and copolymers of (meth)acrylamide. Polymethacrylamides and polyamines, especially those based on epichlorohydrin and dimethylamine, are preferred. The amounts of polymeric precipitation aids are 0.01 to 5 parts by weight, preferably 0.05 to 2.5 parts by weight, per. 100 parts by weight of nitrile rubber.

Also conceivable is the use of other precipitation aids. It should, however, be noted that it is readily possible to carry out the process of the invention with the desired success in the absence of additional precipitation aids, and in particular in the absence of $C_1$-$C_4$-alkylcelluloses, hydroxyalkylcelluloses, plant-based proteinaceous materials or polysaccharides, such as starch, for example, or of water-soluble polyamine compounds.

The latex used for the coagulation advantageously possesses a solids concentration in the range from 1% to 40%, preferably in the range from 5% to 35%, and more preferably in the range from 15% to 30% by weight.

Latex coagulation is carried out in the temperature range from 10 to 100° C., preferably at a temperature of 20 to 90° C. Latex coagulation may take place continuously or batchwise, with continuous operation being preferred.

In one alternative embodiment the latex, freed conventionally from unreacted monomers, can also be treated with acids in a pH range of $\leq 6$, to cause precipitation of the polymer. Treatment is carried out preferably at a pH $\leq 4$, more preferably 2.

The precipitation of the polymer is carried out at temperatures of 20 to 110° C., preferably 50 to 98° C., more preferably at 65 to 85° C. For the precipitation it is possible to use all mineral acids and organic acids which allow the selected pH ranges to be set. Mineral acids are used with preference for pH setting.

For the precipitation it is additionally possible to add a precipitant or precipitation aid. As additional precipitants use is made, for example, of the alkali metal salts of inorganic acids, and also mixtures thereof, that are known to the skilled person. Alkali metal salts contemplated include in particular the sodium salts and potassium salts of the following acids: hydrochloric acid, sulphuric acid, sulphurous acid, nitric acid, nitrous acid and phosphoric acid. The sodium and potassium salts of hydrochloric acid and sulphuric acid are preferred. Particular preference is given to sodium chloride and sodium sulphate. The precipitants are added in an amount of 0.05% to 10%, preferably 0.5% to 8%, more preferably 1% to 5%, by weight, based on the solids content of the latex dispersion. The precipitation aids already listed above can also be used here.

The resultant polymer suspension is adjusted to a pH $\geq 11$ by addition of an aqueous alkali metal hydroxide solution. Preferably the pH is adjusted to $\geq 11.5$. Aqueous alkali metal hydroxide solutions used are solutions of sodium hydroxide or potassium hydroxide, preferably sodium hydroxide, in water, having an alkali metal hydroxide content of 10% to 50%. The alkaline treatment of the coagulated polymer is carried out preferably at 60 to 100° C., preferably at 65 to 95° C., Following the alkaline treatment, the polymer is separated from the suspension in a way which is customary to the skilled person. This variant of latex coagulation as well may take place continuously or batchwise, with preference being given to continuous operation.

Following the coagulation, the nitrile rubber is present typically in the form of what is referred to as crumb. The washing of the coagulated NBR is therefore also referred to as crumb washing. For this washing it is possible to use either deionized water or non-deionized water. Washing is carried out at a temperature in the range from 15 to 90° C., preferably at a temperature in the range from 20 to 80° C. The amount of washing water is 0.5 to 20 parts by weight, preferably 1 to 10 parts by weight and more preferably 1 to 5 parts by weight per 100 parts by weight of nitrile rubber. More preferably the rubber crumb is subjected to a multi-stage wash, with the rubber crumb being partially dewatered between the individual washing stages. The residual moisture contents of the crumb between the individual washing stages are in the range from 5% to 50% by weight, preferably in the range from 7% to 25% by weight. The number of washing stages is typically 1 to 7, preferably 1 to 3. Washing is carried out batchwise or continuously. It is preferred to use a multi-stage, continuous process, with countercurrent washing being preferred in order to save water. After the end of the wash it has been found to be appropriate to dewater the nitrile rubber crumb.

The invention provides, furthermore, vulcanizable mixtures comprising at least one nitrile rubber of the invention, which may also be wholly or partly hydrogenated, and at least one crosslinker. Optionally there are also one or more other additives present.

These vulcanizable mixtures are produced by mixing at least one optionally hydrogenated nitrile rubber of the invention and at least one crosslinker. Optionally, in addition, one or more other additives are mixed into this mixture.

Suitable crosslinkers include, for example, peroxidic crosslinkers such as bis(2,4-dichlorobenzyl) peroxide, dibenzoyl peroxide, bis(4-chlorobenzoyl)peroxide, 1,1-bis(t-butylperoxy)-3,3,5-trimethylcylohexane, tert-butylperbenzoate, 2,2-bis(t-butylperoxy)butene, 4,4-di-tert-butylperoxynonyl valerate, dicumyl peroxide, 2,5-dimethyl-2,5-di (tert-butylperoxy)hexane, tert-butyl cumyl peroxide, 1,3-bis (t-butylperoxyisopropyl) benzene, di-tert-butyl peroxide and 2,5-dimethyl-2,5-di(tert-butylperoxy)hex-3-yne.

It can be advantageous in addition to these peroxidic crosslinkers to use other additives as well that can be employed to help increase the crosslinking yield: suitable examples of such additives include triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

The total amount of the crosslinker or crosslinkers is typically in the range from 1 to 20 phr, preferably in the range from 1.5 to 15 phr and more preferably in the range from 2 to 10 phr, based on the nitrile rubber.

As crosslinkers it is also possible to use sulphur in elemental, soluble or insoluble form, or sulphur donors.

Suitable sulphur donors include, for example, dimorpholyl disulphide (DTDM), 2-morpholino-dithiobenzothiazole (MBSS), caprolactam disulphide, dipentamethylenethiuram tetrasulphide (DPTT), and tetramethylthiuram disulphide (TMTD).

In the case of the sulphur vulcanization of the nitrile rubbers of the invention as well it is also possible to use other additives which can be employed to help increase the crosslinking yield. In principle, however, crosslinking may also take place with sulphur or sulphur donors alone.

Conversely, the crosslinking of the nitrile rubbers of the invention may also take place only in the presence of the abovementioned additives, in other words without addition of elemental sulphur or sulphur donors.

Examples of suitable additives which can be employed to help increase the crosslinking yield include dithiocarbamates, thiurams, thiazoles, sulphenamides, xanthogenates, bicyclic or polycyclic amines, guanidine derivatives, dithiophosphates, caprolactams and thiourea derivatives.

Dithiocarbamates which can be used include, for example, the following: ammonium dimethyl dithiocarbamate, sodium diethyl dithiocarbamate (SDEC), sodium dibutyl dithiocarbamate (SDBC), zinc dimethyl dithiocarbamate (ZDMC), zinc diethyl dithiocarbamate (ZDEC), zinc dibutyl dithiocarbamate (ZDBC), zinc ethylphenyl dithiocarbamate (ZEPC), zinc dibenzyl dithiocarbamate (ZBEC), zinc pentamethylene dithiocarbamate (Z5MC), tellurium diethyl dithiocarbamate, nickel dibutyl dithiocarbamate, nickel dimethyl dithiocarbamate and zinc diisononyl dithiocarbamate.

Thiurams which can be used include, for example, the following: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

Thiazoles which can be used include, for example, the following: 2-mercaptobenzothiazole (MBT), dibenzothiazyl disulphide (MBTS), zinc mercaptobenzothiazole (ZMBT) and copper 2-mercaptobenzo-thiazole.

Sulphenamide derivates which can be used include, for example, the following: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxyethylenesulphenamide.

Xanthogenates which can be used include, for example, the following: sodium dibutylxanthogenate, zinc isopropyldibutylxanthogenate and zinc dibutykanthogenate.

Bicyclic or polycyclic amines which can be used include, for example, the following: 1,8-diazabicyclo[5.4.0]undec-7-ene (DBU), 1,5-diazabicyclo[4.3.0]non-5-ene (DBN), 1,4-diazabicyclo[2.2.2]octane (DABCO), 1,5,7-triazabicyclo[4.4.0]dec-5-ene (TBD) and 7-methyl-1,5,7-triazabicyclo[4.4.0]dec-5-ene.

Guanidine derivates which can be used include, for example, the following: diphenylguanidine (DPG), di-o-tolylguanidine (DOTG) and o-tolylbiguanide (OTBG).

Dithiophosphates which can be used include, for example, the following: zinc dialkyldithiophosphates (chain length of the alkyl radicals $C_2$ to $C_{16}$), copper dialkyldithiophosphates (chain length of the alkyl radicals $C_2$ to $C_{16}$) and dithiophosphoryl polysulphide.

As caprolactam it is possible, for example, to use dithiobiscaprolactam.

As thiourea derivatives it is possible, for example, to use N,N'-diphenylthiourea (DPTU), diethylthiourea (DETU) and ethylenethiourea (ETU).

Likewise suitable as additives are, for example, the following: zinc diamine diisocyanate, hexamethylenetetramine, 1,3-bis(citraconimidomethyl)benzene and cyclic disulphanes.

In the case of hydroxyl-containing nitrile rubbers it is possible, as a further crosslinking method, to use a diisocyanate crosslinking, in which case the diisocyanates used may be monomeric or polymeric types and may further comprise at least two isocyanate groups. As diisocyanates it is possible, individually or as a mixture, to make use, for example, of the following: toluene 2,4-diisocyanate, toluene 2,6-diisocyanate, 4,4'-diphenylmethane diisocyanate, 1,6-hexamethylene diisocyanate, methylcyclohexane diisocyanate, 4,4'-dicyclohexylmethane diisocyanate, 1,3-phenylene diisocyanate, 1,4-phenylene diisocyanate, 1,5-naphthyl diisocyanate, xylylene diisocyanate, 4,4'-diphenyl diisocyanate, 1,2-ethane diisocyanate, 1,3-propane diisocyanate, 1,4-butane diisocyanate, 1,5-pentamethylene diisocyanate, 1,6-hexamethylene diisocyanate, 1,4-cyclohexane diisocyante, 1,6-hexamethylene diisocyanate uretdione, 1,6-hexamethylene diisocyanate biuret, 1,6-hexamethylene diisocyanate isocyanurate and isophorone diisocyanate.

In the case of carboxyl-containing nitrile rubbers it is possible, as a further crosslinking method, to use a polyaminic crosslinking method, in which case the polyamines used contain at least two amino groups, or they are formed in situ during the vulcanization. Polyamines which can be used include, for example, aliphatic polyamines, such as hexamethylenediamine, hexamethylenediamine carbamate, hexamethylenediamine-cinnamaldehyde adducts or hexamethylenediamine dibenzoate salts, or aromatic polyamines such as 2,2-bis(4-(4-aminophenoxy)phenyl)propane, 4,4'-methylenedianiline, m-phenylenediamine, p-phenylenediamine or 4,4'-methylenebis(o-chloroaniline) are used. Reagents which contain at least two hydrazide units, such as isophthalic dihydrazide, adipic dihydrazide or sebacic dihydrazide, are likewise suitable.

Said additives and also the crosslinking agents can be used either individually or else in mixtures. Preference is given to using the following substances for the crosslinking of the nitrile rubbers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinking agents and the abovementioned additives may be used in each case in amounts of about 0.05 to 15 phr, preferably 0.1 to 12 phr, more particularly 0.5 to 10 phr.

In the case of the inventive sulphur crosslinking it may also be sensible, in addition to the crosslinking agents and abovementioned additives, to use further organic and/or inorganic substances as well, examples being zinc oxide, zinc carbonate, lead oxide, magnesium oxide, saturated or unsaturated organic fatty acids and their zinc salts, polyalcohols, amino alcohols, e.g. triethanolamine, and also amines, e.g. dibutylamine, dicyclohexylamine, cyclohexylethylamine and polyetheramines.

As well as these it is also possible to use initial vulcanization inhibitors. These include cyclohexylthiophthalimide (CTP), N,N'-dinitrosopentamethylenetetramine (DNPT), phthalic anhydride (PTA) and diphenylnitrosamine. Cyclohexylthiophthalimide (CTP) is preferred.

Aside from the addition of the crosslinker or crosslinkers, the nitrile rubber of the invention may also be mixed with further customary rubber additives.

These include, for example, the typical substances which are known to the skilled person, such as fillers, filler activators, ozone protectants, antioxidants, processing aids, extender oils, plasticizers, reinforcing materials and mould release agents.

Fillers which can be used include, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates.

Suitable filler activators include, in particular, organic silanes, such as, for example, vinyltrimethyloxysilane, vinyldimethoxymethylsilane, vinyltriethoxysilane, vinyltris(2-methoxy-ethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of 74 to 10 000 g/mol. The amount of filler activators is typically 0 to 10 phr, based on 100 phr of the nitrile rubber.

As antioxidants it is possible to add to the vulcanizable mixtures those which have already been described in this specification in connection with the coagulation of the latex. These inhibitors are used typically in amounts of about 0 to 5 phr, preferably 0.5 to 3 phr, per 100 phr of the nitrile rubber.

As mould release agents contemplation is given, for example, to saturated or partly unsaturated fatty acids and oleic acids and their derivatives (fatty acid esters, fatty acid salts, fatty alcohols, fatty acid amides), and also to products which can be applied to the mould surface, such as, for example, products based on low molecular mass silicone compounds, products based on fluoropolymers, and products based on phenolic resins.

As a constituent of the mixture the mould release agents are used in amounts of about 0 to 10 phr, preferably 0.5 to 5 phr, based on 100 phr of the nitrile rubber.

Also possible is reinforcement with strengthening agents (fibres) of glass in accordance with the teaching of U.S. Pat. No. 4,826,721, as is reinforcement by cords, woven fabrics, fibres of aliphatic and aromatic polyamides (Nylon®, Aramid®), polyesters and natural fibre products.

The invention provides, furthermore, a process for producing vulcanizates on the basis of at least one nitrile rubber, which may also be wholly or partly hydrogenated, which process is characterized in that the above-described vulcanizable mixture is subjected to crosslinking, preferably by raising of the temperature or by photochemical activation. With particular preference this is done as part of a shaping process, more particularly employing an injection moulding process.

The invention provides as well for the vulcanizate obtainable in this process, which is preferably a moulding and more particularly is produced in the aforementioned injection moulding process.

Through this process it is possible to produce a multiplicity of mouldings, examples being seals, caps, hoses or membranes. The nitrile rubbers of the invention, which may also be wholly or partly hydrogenated, are suitable more particularly for the production of o-ring seals, flat seals, corrugated sealing rings, sealing sleeves, sealing caps, dust protection caps, plug seals, thermal insulation hoses (with and without addition of PVC), oil cooler hoses, air intake hoses, servo control hoses or pump diaphragms.

Alternatively to the direct production of mouldings on the basis of the nitrile rubber of the invention it is also possible for the production of the nitrile rubber of the invention to be followed by either (i) a metathesis reaction or (ii) a metathesis reaction and a subsequent hydrogenation or (iii) only a hydrogenation. These metathesis and hydrogenation reactions, respectively, are both well known to the skilled person and described in the literature.

The metathesis is known, for example, from WO-A-02/100941 and also from WO-A-02/100905 and can be used for molecular weight reduction.

A hydrogenation may be carried out using homogeneous or heterogeneous hydrogenation catalysts. It is possible, furthermore, to carry out the hydrogenation in situ, i.e. in the same reaction vessel in which, if appropriate, the metathetic degradation has taken place, with no need for isolation of the degraded nitrile rubber. The hydrogenation catalyst is simply added to the reaction vessel.

The catalysts employed are based typically on rhodium, ruthenium or titanium, although use may also be made of platinum, iridium, palladium, rhenium, ruthenium, osmium, cobalt or copper, either as the metal or else, preferably, in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for hydrogenation in homogeneous phase are described below and are also known from DE-A-25 39 132 and from EP-A-0 471 250.

The selective hydrogenation may be achieved, for example, in the presence of a rhodium- or ruthenium-containing catalyst. Use may be made, for example, of a catalyst of the general formula

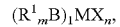

in which M is ruthenium or rhodium, $R^1$ is unlike or different at each occurrence and is a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulphur or a sulphoxide group S=O, X is hydrogen or an anion, preferably halogen and more preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis(triphenylphosphine)rhodium hydride of the formula $(C_6H_5)_3P)_4$RhH and the corresponding compounds in which some or all of the triphenylphosphine has been replaced by tricyclohexylphosphine. The catalyst can be used in small amounts. An amount in the range of 0.01-1% by weight, preferably in the range of 0.03-0.5% by weight and more preferably in the range of 0.1-0.3% by weight, based on the weight of the polymer, is suitable.

Typically it is sensible to use the catalyst together with a cocatalyst which is a ligand of the formula $R^1_mB$, where $R^1$, m and B possess the definitions stated above for the catalyst. Preferably m is 3, B is phosphorus, and the radicals $R^1$ may be alike or different. The cocatalysts in question preferably have trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl radicals.

Examples of cocatalysts are found, for example, in U.S. Pat. No. 4,631,315, A preferred cocatalyst is triphenylphosphine. The cocatalyst is used preferably in amounts in a range of 0.3-5% by weight, preferably in the range of 0.5-4% by weight, based on the weight of the nitrile rubber to be hydrogenated. Preferably, furthermore, the weight ratio of the rhodium-containing catalyst to the cocatalyst is in the range from 1:3 to 1:55, more preferably in the range from 1:5 to 1:45. Based on 100 parts by weight of the nitrile rubber to be hydrogenated, use is made suitably of 0.1 to 33 parts by weight of the cocatalyst, preferably 0.5 to 20 and very preferably 1 to 5 parts by weight, in particular more than 2 but less than 5 parts by weight of cocatalyst per 100 parts by weight of the nitrile rubber to be hydrogenated.

The practical implementation of this hydrogenation is well known to the skilled person from U.S. Pat. No. 6,683,136. It is typically accomplished by subjecting the nitrile rubber to be hydrogenated to the action of hydrogen, in a solvent such as toluene or monochlorobenzene, at a temperature in the range from 100 to 150° C. and at a pressure in the range from 50 bar to 150 bar for 2 to 10 h.

Hydrogenated nitrile rubbers for the purposes of this invention are understood to be wholly or partly hydrogenated nitrile rubbers, and hydrogenation is understood, correspondingly, to be complete or partial reaction of the double bonds present in the initial nitrile rubber, preferably to an extent of at least 50%, more preferably 70-100%, with particular preference 80-100%.

Heterogeneous catalysts, when used, are typically supported catalysts on the basis of palladium, which are supported, for example, on charcoal, silica, calcium carbonate, or barium sulphate.

The unhydrogenated or hydrogenated nitrile rubbers obtained after the metathesis and/or hydrogenation reaction of the nitrile rubbers of the invention can be incorporated into vulcanizable compositions in the same way as for the nitrile rubbers of the invention, and can be used to produce vulcanizates and mouldings based on such vulcanizates.

EXAMPLES

I Production of Nitrile Rubbers A, B, C, D, E and F

Inventive Examples and Comparative Examples

The nitrile rubbers A-F used in the example series below were produced in accordance with the formulas and polymerization conditions specified in Table I, with all of the ingredients being reported in parts by weight per 100 parts by weight of the monomer mixture.

TABLE 1

|  | Nitrile rubber | | | | | |
|---|---|---|---|---|---|---|
|  | A comparative | B | C comparative | D | E comparative | F |
| Butadiene | 62 | 62 | 62 | 62 | 62 | 62 |
| Acrylonitrile | 38 | 38 | 38 | 38 | 38 | 38 |
| Total amount of water | 200 | 200 | 200 | 200 | 200 | 200 |
| Edenor ® HTiCT[1] | 2.20 | 2.20 | 2.20 | 2.20 | 2.20 | 2.20 |
| t-DDM[2] | 0.30 | 0.30 | 0.50 | 0.50 | 0.75 | 0.75 |
| Trigonox NT 50[3] | 0.02 | 0.02 | 0.02 | 0.02 | 0.02 | 0.02 |
| Premix FeSO$_4$[4] | 0.022 | — | 0.026 | — | 0.022 | — |
| Premix FeCl$_2$[4] | — | 0.030 | — | 0.026 | — | 0.022 |
| Diethylhydroxylamine | 0.4 | 0.4 | 0.4 | 0.4 | 0.4 | 0.4 |
| Vulkanox ® BKF[5] | 0.3 | 0.3 | 0.3 | 0.3 | 0.3 | 0.3 |
| pH[6] | 11.0 ± 1.0 | 11.0 ± 1.0 | 11.0 ± 1.0 | 11.0 ± 1.0 | 11.0 ± 1.0 | 11.0 ± 1.0 |
| Polymerization temperature [° C.] | 13.0 ± 0.5 | 13.0 ± 0.5 | 13.0 ± 0.5 | 13.0 ± 0.5 | 13.0 ± 0.5 | 13.0 ± 0.5 |
| Polymerization conversion [%] | 81.7 | 74.8 | 90.1 | 90.3 | 76.3 | 77.6 |
| Polymerization time [h] | 8.5 | 7 | 7 | 7 | 7 | 7.5 |

[1] Edenor ® HTiCT: selectively hydrogenated tallow fatty acid (commercial product "Edenor HTiCT" from Cognis GmbH)
[2] t-DDM: (tertiary dodecyl mercaptan); Lanxess Deutschland GmbH
[3] p-Menthane hydroperoxide (Trigonox NT 50 from Akzo-Degussa)
[4] Containing a reducing agent Rongalit C (sodium salt of a sulphinic acid derivative) and the Fe(II) salt in the amounts specified below
[5] 2-[(2-Hydroxy-5-methyl-3-tert-butyl-phenyl)methyl]-4-methyl-6-tert-butyl-phenol; Lanxess Deutschland GmbH
[6] Measured at the beginning of polymerization The nitrile rubbers were produced batchwise in a 5 l autoclave with stirrer. For the autoclave batches, 1.25 kg of the monomer mixture and a total amount of 2.1 kg of water, and also EDTA, in an aquimolar amount relative to the Fe(II), were used in each case. Of the amount of water, 1.9 kg were included in the initial autoclave charge with the Edenor HtiCT and sodium hydroxide, and flushed with a stream of nitrogen. Thereafter the destabilized monomers and the amount indicated in Table 1 of the t-DDM molecular weight modifier were added, and the reactor was closed. After the contents of the reactor had been thermostated, the polymerizations were commenced by the addition of aqueous solutions of inventive or non-inventive iron(II) salts (in the form of premix solutions) and of para-menthane hydroperoxide (Trigonox NT50).

The premix solution contained 0.986 g of Fe(II)SO$_4$*7H$_2$O or 0.845 g of Fe(II)Cl$_2$*4H$_2$O and 2.0 g of Rongalit C to 400 g of water. Calculating the water of crystallization from the iron compounds, the amount used for both premix solutions is in each case 0.539 g based on 400 g of water.

The course of the polymerization was monitored by gravimetric determinations of the conversion. When the conversion rates indicated in Table 1 were reached, the polymerization was stopped by addition of an aqueous solution of diethylhydroxylamine. Unreacted monomers and other volatile constituents were removed by means of steam distillation.

Before each of the NBR latices was coagulated, it was admixed with a 50% dispersion of Vulkanox® BKF (0.3% by weight of Vulkanox® BKF, based on NBR solids). This was followed by coagulation, by washing and by drying of the resulting crumb.

The dried NBR rubbers were characterized by the Mooney viscosity, their MSR, the ACN content, the glass transition temperature, and its onset and offset point, and also by the differential (ΔACN) of the ACN distribution as calculated by the Gordon-Taylor relationship $T_g=1.4564*[ACN]-77.147$ (ΔACN=ACN (offset)−ACN (onset)).

The properties of the solid rubbers obtained were as follows (Table 2):

TABLE 2

| | Nitrile rubber | | | | | |
|---|---|---|---|---|---|---|
| | A comparative | B | C comparative | D | E comparative | F |
| ACN content (%) | 36.2 | 36.4 | 35.5 | 35.3 | 36.1 | 36.6 |
| Mooney viscosity ML (1 + 4@100° C.) (MU) | 134 | 142 | 80 | 76 | 30 | 25 |
| MSR (Mu/s) | 0.358 | 0.383 | 0.386 | 0.410 | 0.588 | 0.717 |
| Glass transition temperature $T_g$ (° C.) | −23.9 | −23.7 | −25.8 | −24.5 | −24.7 | −23.1 |
| Onset (° C.) | −30.9 | −29.4 | −33.0 | −31.4 | −31.2 | −28.4 |
| Offset (° C.) | −16.6 | −17.4 | −17.4 | −17.1 | −17.8 | −17.3 |
| ΔACN (% by weight) | 9.8 | 8.2 | 10.7 | 9.8 | 9.2 | 7.6 |

Table 3 shows clearly that with the process of the invention, through use of the specific redox system, nitrile rubbers are obtained which differ clearly from those nitrile rubbers obtained by means of a redox system which differs from that used in accordance with the invention only in the use of Fe(II) sulphate. The new nitrile rubbers have a significantly more uniform monomer distribution, which is clearly apparent from the lower ΔACN values in the polymers. The noticeably higher MSR values of the nitrile rubbers of the invention demonstrate, furthermore, that the nitrile rubbers of the invention have a significantly lower level of long-chain branching.

II Production of the Nitrile Rubber Terpolymers G and H

Inventive Example and Comparative Example

The nitrile rubbers G and H used in the example series below were produced in accordance with the base formula specified in Table 3, with all of the ingredients being reported in parts by weight per 100 parts by weight of the monomer mixture. Table 3 also gives the respective polymerization conditions.

TABLE 3

| Nitrile rubber | G | H |
|---|---|---|
| Butadiene | 61.4 | 61.4 |
| Acrylonitrile | 36 | 36 |
| 2-Hydroxyethyl methacrylate | 2.6 | 2.6 |
| Total amount of water | 220 | 220 |
| Texapon ® K-12[1] | 3.0 | 3.0 |
| Na₂SO₄ | 0.12 | 0.12 |
| t-DDM[2] | 0.54 | 0.54 |
| Trigonox NT 50[3] | 0.02 | 0.02 |
| Premix FeSO₄[4] | 0.030 | — |
| Premix FeCl₂[4] | — | 0.030 |
| Diethylhydroxylamine | 0.2 | 0.2 |
| Winstay 29/Naugawhite[5] | 0.18 | 0.18 |
| pH | 7.0 ± 1.0 | 7.0 ± 1.0 |
| Polymerization temperature [° C.] | 8.0 ± 0.5 | 8.0 ± 0.5 |
| Polymerization conversion [%] | 86.1 | 84.2 |
| Polymerization time [h] | 7.0 | 6.5 |

[1]Texapon ® K-12: sodium lauryl sulphate (commercial product "Texapon K-12" from Cognis GmbH)
[2]t-DDM: (tertiary dodecyl mercaptan); Lanxess Deutschland GmbH
[3]p-Menthane hydroperoxide (Trigonox NT 50 from Akzo-Degussa)
[4]Composition as indicated in Table 1 and also above in the text
[5]Mixture of 25 g of Sorbilene Mix (mixture of sorbitan esters and ethoxylated sorbitan esters) from Lamberti, 38 g of Naughawhite (2,2′-methylenebis(6-nonyl-p-cresol) from Chemtura), 125 g of Wingstay 29 (styrenized diphenylamine) from Eliokem and 63 g of water The solid rubbers obtained have the properties reported in Table 4, which were determined as specified for examples series A to F.

TABLE 4

| Nitrile rubber | G | H |
|---|---|---|
| ACN content (%) | 32.2 | 35.0 |
| Mooney viscosity ML (1 + 4@100° C.) (Mu) | 30 | 25 |
| MSR (Mu/s) | 0.578 | 0.633 |
| Incorporation of termonomer (% by weight)[1] | 1.4 | 1.7 |
| Glass transition temperature $T_g$ (° C.) | −34.5/−22.0 | −23.9 |
| Onset (° C.) | −38.9/−25.9 | −29.4 |
| Offset (° C.) | −29.1/−17.5 | −17.2 |
| ΔACN (% by weight) | 12.5[2] | 8.4 |

[1]Determined by ¹H NMR analysis
[2]As the sum of the individual selectivities of ΔACN(1) + ΔACN(1) = ΣΔACN Table 5 shows here that the nitrile terpolymers obtained with the special Fe(II) chloride based redox system clearly have a more uniform monomer distribution (evident from the lower ΔACN values in the polymers) and also a lower degree of long-chain branching (apparent from the higher MSR value). For comparative example G, two glass transition temperatures were measured: from this it is concluded that the non-inventive use of Fe(II)(SO₄) leads not to a uniform copolymer but rather to the formation of polymers which differ so greatly in terms of their monomer distribution that two Tg values were measured.

III Production of Vulcanizates of Nitrile Rubbers E and F

Inventive Example and Comparative Example

In accordance with the method described below, vulcanizates V1 and V2 were produced from nitrile rubbers E and F. The constituents of the mixtures are based on 100 parts of rubber and are reported in Table 5.

TABLE 5

| Mixture | | V1 | V2 (comparative) |
|---|---|---|---|
| Polymer F | | 100 | |
| Polymer E | | | 100 |
| Carbon black IRB 7[1)] | | 40 | 40 |
| Edenor ® C 18 98-100[2)] | | 1 | 1 |
| SULFUR SPIDER[3)] | | 1.54 | 1.54 |
| VULKACIT ® NZ/EGC[4)] | | 0.7 | 0.7 |
| IRM 91[5)] | | 3 | 3 |
| Total | phr | 146.24 | 146.24 |
| Density | g/cm$^3$ | 1.168 | 1.168 |

[1)]IRB 7: Carbon black (Sid Richardson Carbon Co.)
[2)]Edenor ® C 18 98-100: Stearic acid (Caldic)
[3)]SULFUR SPIDER: Sulphur (S$_8$) (Krahn Chemie GmbH)
[4)]VULKACIT ® NZ/EGC: N-tert-Butyl-2-benzothiazolesulphenamide (TBBS) (Lanxess Deutschland GmbH)
[5)]IRM 91: Zinc(II) oxide: (Midwest Zinc)

The mixtures were produced in a Banbury mixer. This was done by mixing the rubber and all of the adjuvants specified in Table 5 for a total of 4 minutes at a maximum temperature of up to 120° C. For this purpose the rubber was introduced into the mixer, all of the further adjuvants were added after 1 minute, and after 2 minutes more a reversal was carried out. After a total of 4 minutes the rubber was discharged from the mixture. The vulcanizates obtained had the properties reported in Tables 6 and 7.

The vulcanization profile on the MDR and the associated analytical data were measured on a Monsanto MDR 2000 rheometer in accordance with ASTM D5289-95.

TABLE 6

| Mixture | V1 | V2 (comparative) |
|---|---|---|
| MDR (130° C./60 min) | | |
| Max. torque (dNm) | 19.06 | 20.43 |
| $t_{10}$ (min) | 14.70 | 14.30 |
| $t_{95}$ (min) | 44.10 | 41.83 |
| MDR (170° C./30 min) | | |
| Max. torque (dNm) | 17.85 | 19.22 |
| $t_{10}$ (min) | 1.29 | 1.31 |
| $t_{95}$ (min) | 5.87 | 4.91 |

Corresponding to the lower degree of branching of the polymer F, the maximum torque is slightly lower in relation to the vulcanizate of comparative polymer E, but is also at a very good level.

The inventive polymer F is distinguished by significantly improved flow properties, which represent an important processing variable. This can be shown via corresponding Rheovulkameter measurements. The Rheovulkameter serves generally to test the processing behaviour of rubber mixtures (injection moulding).

A precisely weighed mixture sample with the compositions specified in Table 5 for V1 and V2, respectively, was introduced into a reservoir and injected by means of a piston, through a nozzle, into a heated test mould. Table 8 shows the parameters and the results of the Rheovulkameter measurement:

TABLE 7

| Mixture | V1 | V2 |
|---|---|---|
| Rheovulkameter | | |
| Preheat temperature (° C.) | 100 | |
| Preheat time(sec) | 100 | |
| Injection pressure (bar) | 97 | |
| Piston temperature (° C.) | 100 | |
| Nozzle temperature (° C.) | 100 | |
| Injection time (sec) | 20 | |
| Vulcanization time (min) | 5 | |
| Vulcanization temperature (° C.) | 180 | |
| Injection volume (cm$^3$) | 2.02 | 1.85 |
| Injection rate (cm$^3$/sec) | 0.099 | 0.091 |
| Fill level (%) | 65.5 | 59.4 |

What is claimed is:

1. A process for producing nitrile rubbers, comprising: performing an emulsion polymerization of
at least one α,β-unsaturated nitrile, and
at least one conjugated diene,
wherein the emulsion polymerization is carried out using a redox system, said redox system comprising
an oxidizing agent comprising at least one peroxo compound,
at least one reducing agent, and
Fe(II) chloride.

2. The process according to claim 1, wherein the at least one peroxo compound comprises at least one of hydrogen peroxide, peroxodisulphates, peroxodiphosphates, hydroperoxides, peracids, peracid esters, peracid anhydrides, peroxides having two organic moieties, or mixtures thereof.

3. The process according to claim 1, wherein the at least one peroxo compound comprises at least one of sodium, potassium or ammonium salts of peroxodisulphuric acid or peroxodiphosphoric acid, t-butyl hydroperoxide, cumene hydroperoxide, pinane hydroperoxide, p-menthane hydroperoxide, dibenzoyl peroxide, 2,4,-dichlorobenzoyl peroxide, di-t-butyl peroxide, dicumyl peroxide, t-butyl perbenzoate or t-butyl peracetate, or mixtures thereof.

4. The process according to claim 1, wherein the at least one reducing agent comprises at least one of sodium formaldehyde-sulphoxylate, sodium benzaldehyde-sulphoxylate, reducing sugars, ascorbic acid, sulphenates, sulphinates, sulphoxylates, dithionite, sulphite, metabisulphite, disulphite, sugars, urea, thiourea, xanthogenates, thioxanthogenates, hydrazinium salts, amines and amine derivatives, aniline, dimethylaniline, monoethanolamine, diethanolamine,triethanolamine, and mixtures thereof.

5. The process according to claim 1, wherein the emulsion polymerization is carried out in the presence of sodium ethylenediaminetetraacetate (EDTA), sodium silicate, sodium pyrophosphate or sodium polyphosphate or trisodium phosphate.

6. The process according to claim 1, wherein the at least one peroxo compound comprises at least one of pinane hydroperoxide or p-menthane hydroperoxide, and
wherein the at least one reducing agent comprises sodium formaldehyde-sulphoxylate, and Fe(II) chloride in the form of FeCl$_2$*4 H$_2$O, and further wherein EDTA is present in the emulsion polymerization.

7. The process according to claim 1, further comprising: after the emulsion polymerization, performing a metathesis reaction whereby the molecular weight of the rubber is reduced.

8. The process according to claim 1, wherein the emulsion polymerization further comprises one or more copolymerizable monomers in addition to the at least one α,β-unsaturated nitrile and the at least one conjugated diene.

9. The process according to claim 7, further comprising: after the metathesis reaction, performing a hydrogenation reaction.

10. The process according to claim 1, further comprising: after the emulsion polymerization, performing a hydrogenation reaction.

* * * * *